United States Patent Office 3,076,856
Patented Feb. 5, 1963

3,076,856
PROCESS FOR PREPARING DIALKYL-
NAPHTHALENE
Robert L. Carden, Poteau, and George C. Feighner and David W. Marshall, Ponca City, Okla., assignors to Continental Oil Company, Ponca City, Okla., a corporation of Delaware
No Drawing. Filed Aug. 27, 1959, Ser. No. 836,351
6 Claims. (Cl. 260—671)

The present invention relates to an improved process for the production of improved dialkylnaphthalene sulfonates. More particularly, it relates to an improved method for alkylating naphthalene, whereby improved sulfonates may be derived therefrom.

The sulfonic acids and sulfonates which are derived from dialkylnaphthalenes are very useful materials. The free sulfonic acid and certain salts of the sulfonic acid are effective plasticizers, especially for rubber. Both the organic and inorganic salts of dinonylnaphthalene sulfonic acid may be used as additives in lubricating oils. The ammonium salts and the amine salts of dinonylnaphthalene sulfonic acid are especially effective additives for motor fuels, such as gasoline or diesel fuel.

According to the prior art methods, the alkylation of naphthalene is generally conducted in the liquid phase, either at a temperature high enough to melt the naphthalene or by using a solvent for the naphthalene. The use of high temperature is detrimental to aluminum chloride catalyzed alkylations of naphthalene (C. A. Thomas, Anhydrous Aluminum Chloride in Organic Chemistry, Reinhold Publishing Co., 1941, pages 104–105). U.S. Patent No. 2,764,548, issued September 25, 1956, to Robert G. King et al., teaches the alkylation of naphthalene in a solvent, for example, nitrobenzene. U.S. Patent No. 2,541,882, issued February 13, 1951, to Robert J. Moore, teaches the use of a mononuclear aromatic hydrocarbon, e.g., benzene, in the alkylation of naphthalene.

It is an object of the present invention to provide an improved process for the production of dialkylnaphthalene sulfonates. It is a further object of the present invention to provide an improved process for the production of dialkylnaphthalene, whereby improved sulfonates may be derived therefrom. It is still a further object of the invention to provide a process whereby the amount of undesirable by-product impurities is kept to a minimum. Other objects and advantages will become apparent from the following description thereof.

Broadly stated, the present invention provides a process for the production of dialkylnaphthalenes comprising the steps of:

(a) Adding to a reaction zone, while maintaining the temperature at about 25 to 65° C., naphthalene, a monoalkylnaphthalene fraction, and a catalyst comprising aluminum chloride and a promoter, (b) Adding an olefin to the reaction zone while agitating the mixture and maintaining the temperature thereof at about 25 to 65° C., (c) Recovering from said reaction mass a paraffinic hydrocarbon fraction, a naphthalene fraction, a monoalkylnaphthalene fraction, and a dialkylnaphthalene fraction.

In a preferred embodiment the olefinic hydrocarbon is nonene, with dinonylnaphthalene being the desired product, and mononoylnaphthalene being used to form the slurry in step (a). All of the mononoylnaphthalene produced in step (c) is recycled to form the slurry in step (a). In this maner no net mononoylnaphthalene is formed in the process and yields of dinonylnaphthalene are high.

Before proceeding to specific examples which illustrate our invention, it is desirable first, to define the materials and operating conditions of our invention.

For the sake of brevity, the abbreviations MNN and DNN may be used herein to represent mononoylnaphthalene and dinonylnaphthalene, respectively.

Generally, any grade of naphthalene may be used in our invention. Obviously, the better grades will give a purer product. We prefer to use a semi-purified grade, which is known commercially as 78° naphthalene.

The preferred olefin for our invention is nonene and, in particular, that produced by the polymerization of propene with a phosphoric acid-kieselguhr catalyst at about 1000 p.s.i.g. and 400° F. The catalytic polymerization of propylene resulting in the formation of by-product nonene is illustrated in the patent to Grote et al., U.S. Patent No. 2,457,146, the nonene being described therein as low-boiling polymer ($C_6$–$C_{12}$), a portion of which is recycled through line 32, and the remainder of which is withdrawn through line 33. The "true" nonene portion is highly branched and contains tertiary carbon atoms. The following physical properties are typical of the nonene we prefer to use:

| | |
|---|---|
| A.P.I. gravity | 62.2 |
| Initial boiling point | ° F  127 |
| 10% | ° F  240 |
| 50% | ° F  274 |
| 90% | ° F  303 |
| End point | ° F  326 |

Mass spectrometer analyses of two typical nonene samples are shown in Table I.

TABLE I

*Mass Spectrometer Analyses of Nonene Samples*

| Compound | Sample (Liquid Volume Percent) | |
|---|---|---|
| | A | B |
| $C_5$ and less | 2.7 | |
| $C_6$ | 3.0 | |
| $C_7$ | 7.2 | 7.0 |
| $C_8$ | 12.8 | 14.7 |
| $C_9$ | 45.3 | 55.5 |
| $C_{10}$ | 23.1 | 19.1 |
| $C_{11}$ | 5.4 | 3.4 |
| $C_{12}$ | 0.5 | 0.3 |

It is to be understood that this is typical, and we do not intend to be limited thereby. Olefins having physical properties other than these are also suitable.

With regard to the amount of olefin, we prefer to use the theoretical olefin to naphthalene ratio, or 2 to 1. Ratios within the range of 1:1 to 3:1 are suitable.

The monoalkylnaphthalene used in our process corresponds to the olefin used. Accordingly, it is usually mononoylnaphthalene. The material is not pure, but is characterized by a boiling point range, as will be apparent from the examples. A suitable range of MNN to naphthalene, on a mole basis, is 0.10 to 2.0, with a preferable range being from 0.25 to 1.0. Generally, we recycle all of the material from a previous batch. It should be noted here that we have run as many as nine cyclic alkylations with no evidence of MNN buildup.

The catalyst of our invention comprises aluminum chloride and a proton-donor promoter. Examples of preferred promoters are anhydrous hydrogen chloride and water. Suitable materials include any material which, when added to aluminum chloride, yields a proton donor.

The amount of aluminum chloride which may be suitably used in our process is 2 to 10 percent by weight of the nonene used. More preferably, we use aluminum chloride in the range of 2.5 to 4 percent of the nonene. When using hydrogen chloride as the promoter, we use from 2 to 12 percent by weight of the aluminum chloride. Other promoters used fall within this range on a hydrogen equivalent basis.

A suitable temperature range for conducting the alkylation reaction is 25 to 65° C., with a preferable temperature range being from 40 to 50° C.

Time is not a critical factor in the alkylation reaction. Usually, we prefer to add the olefin to the reaction vessel at a moderate and uniform rate, which affords better contact, gives improved yields, and facilitates temperature control of the exothermic reaction.

The DNN can be sulfonated by any of the methods well known to those skilled in the art by treatment with any suitable sulfonating agent, such as chlorosulfonic acid, fuming sulfuric acid (oleum), etc. In a preferred method, the DNN is dissolved in n-hexane and sulfonated with 1 part of 20 percent oleum, by weight, per part of DNN. The temperature is kept below 40° C. during the sulfonation. The reaction is "killed" by the addition of water followed by vigorous agitation. The reaction mixture is then allowed to settle. The sludge is separated, and the hexane solution of sulfonic acids is degassed to remove dissolved $SO_2$ after which the solution is treated with clay. The sulfonic acids are then ready for neutralization.

Neutralization can be accomplished by any of several known methods. This is dependent on the salt desired. Suitable bases include the following: alkali metal hydroxides, alkaline earth metal hydroxides, and organic bases, such as amines.

The DNN produced by our process is not a pure compound. The combining weights of the sodium sulfonates prepared from our DNN indicate that the alkyl groups present therein contain more than a total of 18 carbon atoms. We refer to the material boiling above 250° C. at 20 mm. Hg. pressure as DNN.

DNN prepared at higher alkylation temperatures contains alkylated binaphthyls. By contrast, the DNN prepared by our process contains none or a greatly reduced amount of alkylated binaphthyls. During the sulfonation, undesirable impurities are formed from the alkylated binaphthyls. In addition, the DNN prepared by our process gives an improved yield of sodium sulfonate, as shown in the examples.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

EXAMPLE I

This example shows the results of conducting the alkylation at higher temperatures (75–85° C.).

Charge:
256 grams naphthalene
455 grams nonene
371 grams monononylnaphthalene (MNN)
27.3 grams aluminum chloride
1.1 grams water Procedure:

The MNN and the naphthalene were charged to a reaction flask. One-half of the aluminum chloride and one-half of the water were added. Stirring was begun and the nonene was added over a 30-minute period, while keeping the temperature at 75–85° C. One-fourth of the aluminum chloride and water were added at 10 minutes elapsed time. The final amount of aluminum chloride and water were added at 20 minutes elapsed time. The crude alkylate was washed with water and then washed twice with dilute sodium hydroxide.

The average of four runs made under these conditions is given below.
Products:

931 grams washed crude alkylate
98 grams nonane
56 grams naphthalene
368 grams MNN
407 grams DNN (dinonylnaphthalene)
23.7 grams loss and holdup
0.893 DNN/nonene ratio Distillation cuts in the above were as follows:

Nonane to 175° C. at 1 atm.
Naphthalene to 175° C. at 100 mm.
MNN to 250° C. at 20 mm.
DNN bottoms

EXAMPLE II

This example shows the yield of DNN obtained using a procedure of the prior art.
Charge:

907 grams nitrobenzene
303 grams naphthalene (2.37 moles)
625 grams nonene (4.96 moles)
45.3 grams aluminum chloride (7.25% of nonene)

Procedure:

The aluminum chloride was dissolved in the nitrobenzene at 25° C. and then the naphthalene was added. The nonene was added to the solution in 35 minutes while keeping the temperature at or below 25° C. The crude alkylate was washed with water and then washed twice with dilute sodium hydroxide. The yield of crude alkylate was 1802 grams.

Distillation of the crude alkylate gave the following:

| Fraction | Temperature and Pressure | Weight (grams) |
| --- | --- | --- |
| Nonane and water | to 175° C. at 1 atm | 170.1 |
| Nitrobenzene and naphthalene | to 110° C. at 15 mm. Hg | 1,061.2 |
| MNN | to 250° C. at 20 mm. Hg | 304.2 |
| DNN | bottoms | 252.2 |
| Loss and holdup | | 30.2 |

DNN/nonene ratio=0.403.
DNN/nonene ratio assuming 100% conversion of MNN to DNN by recycle=0.848.

EXAMPLE III

This example shows the alkylation of naphthalene in the absence of a solvent.
Charge:

384 grams naphthalene
756 grams nonene
45.5 grams aluminum chloride
1.8 grams water Procedure:

One-half of the aluminum chloride, one-half of the water, and all of the naphthalene were placed in a reaction flask with no solvent. Stirring of the dry mixture was begun and the nonene was added over a period of 30 minutes, keeping the temperature below 55° C. The remainder of the catalyst was added in equal portions at 10 and 20 minutes elapsed time. The product was worked up as in the previous examples and distilled, with fractions being taken at the conditions indicated in Example I.

Products:

980 grams washed crude alkylate
62 grams nonane
¹ grams naphthalene
296 grams MNN
610 grams DNN
12 grams loss and holdup
0.80 DNN/nonene ratio ¹ Not determined.

EXAMPLE IV

This example shows the preparation of DNN using a slurry of naphthalene in MNN.

Charge:

254 grams naphthalene
500 grams nonene
 (Mole ratio of nonene/naphthalene=2:1)
17.5 grams aluminum chloride (3.5% of nonene)
1.5 grams HCl
301 grams MNN Procedure:

The MNN and naphthalene were charged to a reaction flask and HCl was added for about 10 minutes. One-half of the aluminum chloride was then added, and the nonene was added over a 30-minute period. The remainder of the aluminum chloride was added at 10 and 20 minutes elapsed time, with the HCl being added continuously throughout the reaction. The temperature was maintained at 45° C. throughout the reaction. The product was worked up as in the previous examples and distilled, with fractions being taken as indicated in Example I.

With the charge and procedure being the same, the average yield of the products obtained in 6 runs is shown below.

Products:

971 grams washed crude alkylate
81.5 grams nonane
39.1 grams naphthalene
309.5 grams MNN
531.4 grams DNN
12.8 grams loss and holdup
1.063 DNN/nonene ratio

EXAMPLE V

This example also shows the preparation of DNN using a slurry of naphthalene in MNN. It differs from Example IV in the amounts of aluminum chloride and MNN used.

Charge:

254 grams naphthalene
500 grams nonene
15 grams aluminum chloride (3% of nonene)
1.5 grams HCl
341 grams MNN Procedure:

The procedure was the same as in Example IV. The average yield of the products obtained in 2 runs is shown below.

Products:

1062 grams washed crude alkylate
114 grams nonane
43.6 grams naphthalene
339.9 grams MNN
547 grams DNN
17.1 grams loss and holdup
1.094 DNN/nonene ratio

EXAMPLE VI

This example also shows the preparation of DNN using a slurry of naphthalene in MNN. It differs from Examples IV and V in the amounts of aluminum chloride and MNN used.

Charge:

254 grams naphthalene
500 grams nonene
12.5 grams aluminum chloride (2.5% of nonene)
1.5 grams HCl
341 grams MNN Procedure:

The procedure was the same as in Example IV. The average yield of the products obtained in 2 runs is shown below.

Products:

1012 grams washed crude alkylate
52.7 grams nonane
48.4 grams naphthalene
338.2 grams MNN
559.4 grams DNN
9.3 grams loss and holdup
1.12 DNN/nonene ratio

EXAMPLE VII

This example shows the pilot plant preparation of DNN using a slurry of naphthalene in MNN.

Charge:

13.7 lbs. naphthalene
27 lbs. nonene
12.5 lbs. MNN
1.08 lbs. aluminum chloride (4% nonene)
0.09 lb. HCl Procedure:

The MNN (obtained from a previous run) and naphthalene were charged to a 10-gallon Pfaudler vessel. While stirring, HCl was bubbled through the mixture for about 20 minutes. One-half of the aluminum chloride was added to the mixture. While maintaining the reaction temperature at 43 to 49° C., the nonene was charged to the reactor at a steady rate over a 30-minute period. The remaining half of the aluminum chloride was added in four equal batches to the reactor during the nonene addition. Also, the flow of HCl was continued during the nonene addition.

The reaction mass was poststirred for 30 minutes, diluted with nonane (10 pounds) to aid settling of the sludge, and then transferred to a cone bottomed settler. The mass was settled for one hour and the sludge withdrawn. The resulting mass was washed with five percent aqueous caustic (12 pounds). Formula 30 alcohol (6 pounds) was added to aid separation. The mass was settled overnight and the aqueous alcohol-caustic phase withdrawn.

Distillation of the crude alkylate gave the following:

| Fraction | Temperature and Pressure | Weight (lbs.) |
|---|---|---|
| Nonane and water | to 210° C. at 1 atm | 8.5 |
| Naphthalene | 210° C. to 250° C. at 1 atm | 0.79 |
| MNN | to 244° C. at 20 mm. Hg | 10.62 |
| DNN | bottoms | 32.0 |

DNN/nonene ratio=1.18.

EXAMPLE VIII

This example shows that the DNN prepared according to the process of this invention (Examples III–VII) is a better sulfonation stock than DNN prepared by other processes. A standard procedure and a standard charge were used on all samples. They were as follows—

Charge:

100 grams DNN
100 grams 20% oleum
400 grams n-hexane
18 grams water

Procedure:

The DNN was sulfonated in n-hexane; the sulfonation mixture was quenched with water; the spent acid was settled and separated; the resulting hexane solution was clay treated, degassed, filtered, neutralized, and stripped of solvent to give the finished sodium sulfonate. The results of the various sulfonations of this example are shown in Table II.

TABLE II

*Sulfonate Yields—Varying DNN Preparations*

| Description of DNN: | Sodium sulfonate grams (as is) |
|---|---|
| Made at 75–85° C. (similar to Example I) | 109 |
| Nitrobenzene as solvent (similar to Example II) | 100 |
| Low temperature alkylation, using slurry of naphthalene in MNN and 3.5% AlCl$_3$/nonene ratio (similar to Examples III–VII) | 120 |
| Similar to preceding, except 3.0% AlCl$_3$/nonene ratio | 117 |
| Similar to preceding, except 2.5% AlCl$_3$/nonene ratio | 114 |

In summary, Examples IV, V, and VI show that improved yields of dinonylnaphthalene are obtained by the alkylation steps of our process. In additon, Example I shows the detrimental effect of higher temperatures on the alkylation process, while Example II shows, for purpose of comparison, the yield obtained by a process of the prior art. Still further, Example III shows the alkylation of naphthalene in the absence of a solvent. Example VII shows that the alkylation steps of our improved process give good results on a pilot plant scale. Example VIII shows that the DNN produced by the alkylation steps of our process is a better sulfonation stock than that prepared by other processes. Examples IV, V, and VII show that mononoylnaphthalene, which under many circumstances could be considered an undesirable by-product, can be recycled and thereby utilized.

Although the examples set forth above illustrate a batch process, it will be apparent that the invention is equally applicable to a continuous process.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

We claim:

1. An improved process for the production of dinonylnaphthalene, said process comprising carrying out in the absence of added solvent the steps of:
    (a) adding to a reaction zone materials consisting essentially of naphthalene, mononoylnaphthalene and a catalyst comprising aluminum chloride and a promoter,
    (b) adding nonene to the reaction zone, while agitating the mixture and maintaining the temperature thereof at about 25 to 65° C., and
    (c) recovering from said reaction mass a paraffinic hydrocarbon fraction, a naphthalene fraction, a mononoylnaphthalene fraction, and a dinonylnaphthalene fraction.

2. An improved process for the production of dinonylnaphthalene, said process comprising carrying out in the absence of added solvent the steps of:
    (a) forming a slurry consisting essentially of naphthalene and mononoylnaphthalene,
    (b) adding thereto a catalyst comprising aluminum chloride and a promoter,
    (c) adding nonene to the reaction mass, while agitating the mixture and maintaining the temperature thereof at about 40 to 50° C.,
    (d) maintaining the reaction mixture at a temperature at about 40 to 50° C. for a period of time sufficient to effect said reaction, and
    (e) recovering from the reaction mass a nonane fraction, a naphthalene fraction, a mononoylnaphthalene fraction, and a dinonylnaphthalene fraction.

3. The process of claim 1 wherein the mononoylnaphthalene of step (c) is recycled to step (a).

4. An improved process for the production of dinonylnaphthalene, said process comprising carrying out in the absence of added solvent the steps of:
    (a) adding to a reaction zone, while maintaining the temperature thereof at about 25 to 65° C., materials consisting essentially of naphthalene, 0.10 to 2.0 moles of mononoylnaphthalene per mole of naphthalene, and a catalyst comprising aluminum chloride and a promoter wherein the aluminum chloride is present in the range of 2 to 10 percent (by weight) of the nonene to be used, and the promoter is present in the range of 2 to 12 percent (by weight) of said aluminum chloride,
    (b) adding nonene, in the amount of from 1 to 3 moles of said nonene per mole of naphthalene, to the reaction zone, while agitating the mixture and maintaining the temperature thereof at about 25 to 65° C.,
    (c) maintaining the reaction mixture at a temperature of about 25 to 65° C. for a period of time sufficient to effect said reaction,
    (d) recovering from the reaction mass a nonane fraction, a naphthalene fraction, a mononoylnaphthalene fraction, and a dinonylnaphthalene fraction.

5. The process of claim 4 wherein the nonene is characterized as being produced by the polymerization of propene and possessing greater than 40 percent (by volume) of C$_9$ material.

6. The process of claim 5 characterized in that the following fractions are recovered by distillation from the reaction mass:
    (1) to 75° C. at 1 atmospheric pressure, and comprising nonane with a trace of water,
    (2) to 75° C. at 100 millimeters Hg pressure and comprising substantially naphthalene,
    (3) to 250° C. at 20 millimeters Hg pressure and comprising substantially mononoylnaphthalene,
    (4) above 250° C. at 20 millimeters Hg and comprising substantially dinonylnaphthalene.

References Cited in the file of this patent

UNITED STATES PATENTS

| 2,541,882 | Moore | Feb. 13, 1951 |
| 2,686,201 | Keenan | Aug. 10, 1954 |
| 2,764,548 | King et al. | Sept. 25, 1956 |
| 2,806,875 | Geiser | Sept. 17, 1957 |